(12) United States Patent
Hwang et al.

(10) Patent No.: US 8,053,484 B2
(45) Date of Patent: Nov. 8, 2011

(54) COMPOSITION FOR POLYURETHANE FOAM AND POLYURETHANE FOAM PREPARED THEREFROM

(75) Inventors: Sung Woo Hwang, Daejeon (KR); Myung Dong Cho, Hwaseong-gun (KR); Sang Ho Park, Yongin-si (KR); Kwang Hee Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 274 days.

(21) Appl. No.: 12/546,358

(22) Filed: Aug. 24, 2009

(65) Prior Publication Data

US 2010/0113635 A1 May 6, 2010

(30) Foreign Application Priority Data

Nov. 6, 2008 (KR) .................. 10-2008-0109869

(51) Int. Cl.
- *C08G 18/22* (2006.01)
- *C08G 18/48* (2006.01)
- *C08G 18/00* (2006.01)
- *C08G 18/08* (2006.01)
- *C08G 18/16* (2006.01)
- *C08J 9/00* (2006.01)
- *C08L 75/00* (2006.01)

(52) U.S. Cl. ........ 521/119; 521/130; 521/137; 521/155; 521/170; 521/172; 521/174; 528/44; 528/48

(58) Field of Classification Search ................ 521/119, 521/130, 147, 155, 170, 172, 174; 528/44, 528/48

See application file for complete search history.

(56) References Cited

U.S. PATENT DOCUMENTS

| 3,883,466 | A | * | 5/1975 | Olstowski | 524/729 |
| 5,442,034 | A | * | 8/1995 | Primeaux, II | 528/60 |
| 2008/0138716 | A1 | * | 6/2008 | Iwama et al. | 429/338 |

FOREIGN PATENT DOCUMENTS

| KR | 1020010032761 A | 4/2001 |
| KR | 1020040012556 A | 2/2004 |
| KR | 1020040087601 A | 10/2004 |
| KR | 1020050097809 A | 10/2005 |
| WO | 9501385 A1 | 1/1995 |
| WO | 9709361 A | 3/1997 |

* cited by examiner

*Primary Examiner* — Mark Eashoo
*Assistant Examiner* — Melissa Rioja
(74) *Attorney, Agent, or Firm* — Cantor Colburn LLP

(57) ABSTRACT

A polyurethane foam composition includes a polyol, a polyisocyanate, a catalyst, a foam stabilizer, a blowing agent and a fluorinated carbonate wherein the fluorinated carbonate is a compound represented by Formula 1:

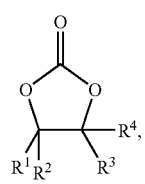

(1)

a compound represented by Formula 2:

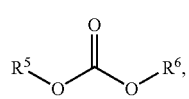

(2)

or a mixture thereof. Also disclosed is a polyurethane foam derived from the composition.

12 Claims, 5 Drawing Sheets

(a) Pure FEC (b) FEC in PU Foam $H_b$ and $H_{b'}$ $H_a$

COMPOSITION FOR POLYURETHANE FOAM AND POLYURETHANE FOAM PREPARED THEREFROM

CROSS-REFERENCE TO RELATED APPLICATION

This application claims priority to Korean Patent Application No. 10-2008-0109869, filed on Nov. 6, 2008, and all the benefits accruing therefrom under 35 U.S.C. §119, the contents of which in its entirety are herein incorporated by reference.

BACKGROUND

1. Field

This disclosure relates to a polyurethane foam composition for the production of an environmentally friendly polyurethane thermal insulation material and a polyurethane foam derived from the polyurethane foam composition.

2. Description of the Related Art

Polyurethane foams are widely used in various industrial applications. For example, polyurethane foams are used alone or in combination with other materials to produce thermal insulation materials, lightweight structural materials and cushioning materials, taking advantage of their inherent high thermal insulation, light weight and excellent cushioning properties. Rigid polyurethane foams have lower thermal conductivity than other thermal insulation materials that are currently in commercial use. Such excellent thermal insulation properties make rigid polyurethane foams suitable for use as thermal insulation in various applications, including refrigerators, buildings and electronic products that benefit from a high degree of thermal insulation.

Numerous efforts have been made to further decrease the thermal conductivity (k-factor) of polyurethane foams. To this end attempts have been made to reduce the size of individual cells within a polyurethane foam. Cell size reduction is known to inhibit radiative heat transfer through the cells, thus lowering the thermal conductivity of the polyurethane foam, thereby improving the thermal insulation performance of the polyurethane foam.

In recent years, there has been an increased demand to develop environmentally friendly polyurethane foams. Polyurethane foams can be commercially prepared using chlorofluorocarbons ("CFCs"). CFCs are classified as being highly destructive to the environment in that they cause depletion of the earth's stratospheric ozone layer and contribute to the greenhouse effect, and their use is currently restricted.

Under these circumstances, there is a need to develop a polyurethane foam that is environmentally friendly and has excellent thermal insulation performance.

SUMMARY

Disclosed herein is a polyurethane foam composition including a polyol, a polyisocyanate, a catalyst, a foam stabilizer, a blowing agent and a fluorinated carbonate wherein the fluorinated carbonate is a compound represented by Formula 1:

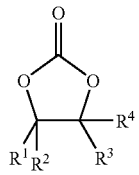

wherein $R^1$, $R^2$, $R^3$ and $R^4$ are the same or different and each of $R^1$, $R^2$, $R^3$ and $R^4$ independently represent a hydrogen atom, a fluorine atom, a $C_1$-$C_{16}$ fluoroalkyl group, a $C_3$-$C_{30}$ cycloalkyl group or a $C_3$-$C_{30}$ aromatic group, with the proviso that at least one of $R^1$, $R^2$, $R^3$ and $R^4$ is a fluorine atom or a $C_1$-$C_{16}$ fluoroalkyl group, and each of the $C_1$-$C_{16}$ fluoroalkyl group, the $C_3$-$C_{30}$ cycloalkyl group and the $C_3$-$C_{30}$ aromatic groups are unsubstituted or substituted with a halogen atom, a $C_1$-$C_{30}$ alkyl group, a $C_1$-$C_{30}$ haloalkyl group, a $C_6$-$C_{30}$ aryl group, a $C_1$-$C_{20}$ alkoxy group or a combination thereof;

a compound represented by Formula 2:

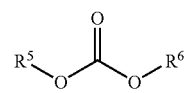

wherein $R^5$ and $R^6$ are the same or different and each of $R^5$ and $R^6$ independently represent a fluorine atom, a $C_1$-$C_{16}$ fluoroalkyl group, a $C_3$-$C_{30}$ cycloalkyl group or a $C_3$-$C_{30}$ aromatic group, with the proviso that at least one of $R^5$ and $R^6$ is a fluorine atom or a $C_1$-$C_{16}$ fluoroalkyl group, and each of the $C_1$-$C_{16}$ fluoroalkyl group, the $C_3$-$C_{30}$ cycloalkyl group and the $C_3$-$C_{30}$ aromatic groups are unsubstituted or substituted with a halogenatom, a $C_1$-$C_{30}$ alkyl group, a $C_1$-$C_{30}$ haloalkyl group, a $C_6$-$C_{30}$ aryl group, a $C_1$-$C_{20}$ alkoxy group or a combination thereof; or a mixture thereof.

Also disclosed herein is a polyurethane foam derived from the composition.

BRIEF DESCRIPTION OF THE DRAWINGS

The patent or application file contains at least one drawing executed in color. Copies of this patent or patent application publication with color drawings will be provided by the Office upon request and payment of the necessary fee.

The exemplary embodiments will be more clearly understood from the following detailed description taken in conjunction with the accompanying drawings, in which.

DETAILED DESCRIPTION

Figure 1:
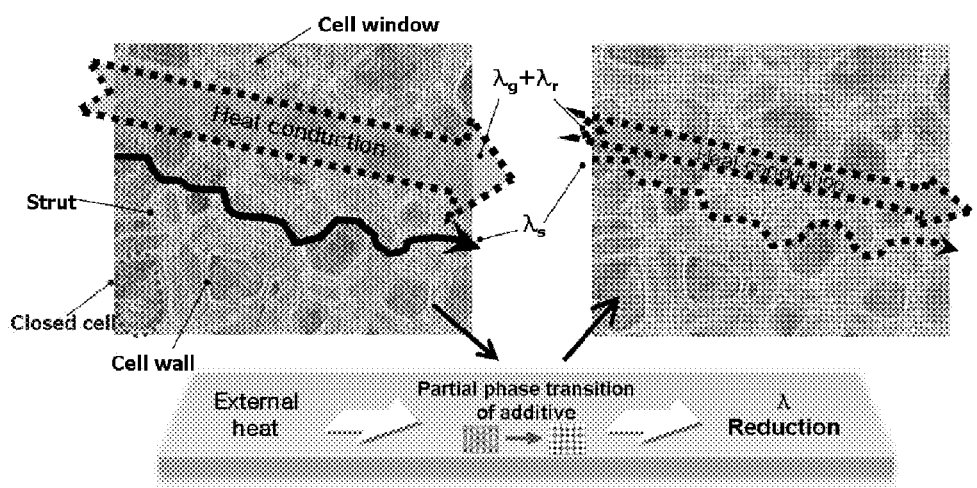
FIG. 1 is a conceptual diagram illustrating heat transfer within an exemplary embodiment of a polyurethane foam.

Exemplary embodiments are further described in greater detail hereinafter with reference to the accompanying drawings, in which exemplary embodiments are shown. These exemplary embodiments can, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements can be present. As used herein, the term "and/or" includes any and all combinations of one or more of the associated listed items.

It will be understood that although the terms first, second, third, etc. can be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms such as "lower" or "bottom" and "upper" or "top," can be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower" can therefore encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Unless otherwise defined, the term "substituted" as used herein means that at least one hydrogen atom is replaced by a halogen atom, a $C_1$-$C_{30}$ alkyl group, a $C_1$-$C_{30}$ haloalkyl group, a $C_6$-$C_{30}$ aryl group, a $C_1$-$C_{20}$ alkoxy group or combinations thereof.

A halogen atom is an element from Group 17 (formerly group VII, VIIA) of the periodic table as defined by the International Union of Pure and Applied Chemistry ("IUPAC"), and comprises fluorine (F), chlorine (Cl), bromine (Br), iodine (I) and astatine (At).

A haloalkyl group is a halogen substituted alkyl group.

An aryl group is any functional group or substituent derived from an aromatic ring.

An alkoxy group is an alkyl group, which is a branched or straight chain saturated aliphatic hydrocarbon group containing carbon and hydrogen, linked through oxygen, thus R—O—.

According to one exemplary embodiment, there is provided a rigid polyurethane foam composition including a polyol, a polyisocyanate, a catalyst, a foam stabilizer, a blowing agent and a fluorinated carbonate. In an embodiment, a rigid polyurethane foam comprises closed cells. A rigid polyurethane foam consists of pores that are made up of closed cells, or predominantly closed cells. Rigid polyurethane foams have high mechanical strength and are non-flexible, particularly in comparison to soft polyurethane foams. In some embodiments, rigid polyurethane foams are derived from methylene diisocyanate ("MDI"), and soft polyurethane foams are derived from toluene diisocyanate ("TDI").

Heat transfer in a polyurethane foam can be generally expressed by the following relation:

$$\lambda_{total} = \lambda_g + \lambda_s + \lambda_r$$

wherein $\lambda_g$ is gaseous thermal conductivity, representing heat transfer by convection of air within closed cells or other gases;

$\lambda_s$ is solid thermal conductivity, representing direct heat transfer through polyurethane solid matrix; and $\lambda_r$ is radiative thermal conductivity, representing heat transfer through cell walls and cell windows.

The heat transfer parameters can be controlled to improve the thermal insulation performance of exemplary embodiments of a polyurethane foam derived from the polyurethane foam composition.

The polyol is polar, whereas the fluorinated carbonate is rendered nonpolar due to the presence of at least one fluorine atom substitution. The difference in miscibility between the fluorinated carbonate and the polyol can induce the formation of a number of fine cell nuclei at the initial stage of the reaction and reduce the surface tension of closed cells to inhibit the growth and ripening of the closed cells. Ripening, as used herein, refers to an increase in pore size by drawing in smaller pores. Thus inhibition of ripening of the closed cells refers to preventing larger pores from drawing in smaller pores, thus leaving smaller pores in the matrix. As a result, the size of the closed cells can be small and uniform, which contributes to a reduction in the thermal conductivity, particularly radiative thermal conductivity ($\lambda_r$), of the resulting polyurethane foam.

The general polyurethane foam can be prepared from a mixture comprising a polyol, a polyisocyanate, a foam stabilizer, a catalyst, a blowing agent and optional additives for adjusting the course of the reaction and/or properties of the foam by reacting the polyol with the polyisocyanate. The blowing agent is vaporized by heat liberated during the reaction. The reaction is can be carried out at about 40° C. to about 60° C. The reaction heat is estimated to increase the reaction temperature to about 120° C. Since the fluorinated carbonate has a boiling point from about 100° C. to about 260° C., specifically from about 200° C. to about 240° C., more specifically about 150° C., it exists in a solid or liquid state within the resulting polyurethane foam derived from the composition without being vaporized, causing reduced or effectively no environmental pollution in the preparation of the polyurethane foam.

The fluorinated carbonate has a freezing point lower than 100° C. In one exemplary embodiment, the freezing point of the fluorinated carbonate can be from about −20° C. to about 90° C., specifically from about −10° C. to about 40° C., more specifically from about 0° C. to about 30° C. In an embodiment, the fluorinated carbonate can undergo a phase transition around room temperature. The phase transition of the fluorinated carbonate from a solid state to a liquid state can inhibit heat transfer when a temperature change occurs around room temperature. In addition, the fluorinated carbonate is insoluble in the polyol and exists in an independent state (as a separate phase) due to the difference in miscibility between the fluorinated carbonate and the polyol. While not wanting to be bound by theory, the fluorinated carbonate can be disposed at a cell wall in the course of the preparation of a polyurethane foam using the composition. The fluorinated carbonate disposed at the cell wall absorbs heat supplied from the outside through the phase transition. For example, when the polyurethane foam is used as a thermal insulation material for a low-temperature system (e.g., a refrigerator), externally supplied heat is used to change the phase of the fluorinated carbonate and is not substantially delivered into the system, thereby improving thermal insulation performance.

FIG. 1 is a conceptual diagram illustrating heat transfer within an exemplary embodiment of a polyurethane thermal insulation material produced using the composition. Referring to FIG. 1, when external heat is supplied to the polyurethane thermal insulation material, the fluorinated carbonate undergoes a partial phase transition to absorb the heat while blocking the conduction of the heat, resulting in a reduction in thermal conductivity. In FIG. 1, the deformation of the cross-hatched structure indicates the phase change of the fluorinated carbonate, and the reduced thickness of the arrows indicates a reduction in thermal conductivity arising from the phase change.

In one exemplary embodiment, the fluorinated carbonate can be a compound represented by Formula 1:

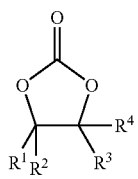

(1)

wherein $R^1$, $R^2$, $R^3$ and $R^4$ can be the same or different and each of $R^1$, $R^2$, $R^3$ and $R^4$ independently represent a hydrogen atom, a fluorine atom, a $C_1$-$C_{16}$ fluoroalkyl group, a $C_3$-$C_{30}$ cycloalkyl group or a $C_3$-$C_{30}$ aromatic group, with the proviso that at least one of $R^1$, $R^2$, $R^3$ and $R^4$ is a fluorine atom or a $C_1$-$C_{16}$ fluoroalkyl group, and each of the $C_1$-$C_{16}$ fluoroalkyl group, the $C_3$-$C_{30}$ cycloalkyl group and the $C_3$-$C_{30}$ aromatic group are unsubstituted or substituted with a halogen atom, a $C_1$-$C_{30}$ alkyl group, a $C_1$-$C_{30}$ haloalkyl group, a $C_6$-$C_{30}$ aryl group, a $C_1$-$C_{20}$ alkoxy group, or the like or a combination thereof;

a compound represented by Formula 2:

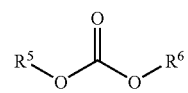

(2)

wherein $R^5$ and $R^6$ can be the same or different and each independently represents a fluorine atom, a $C_1$-$C_{16}$ fluoroalkyl group, a $C_3$-$C_{30}$ cycloalkyl group or a $C_3$-$C_{30}$ aromatic group, with the proviso that at least one of $R^5$ and $R^6$ is a fluorine atom or a $C_1$-$C_{16}$ fluoroalkyl group, and each of the $C_1$-$C_{16}$ fluoroalkyl group, the $C_3$-$C_{30}$ cycloalkyl group, and the a $C_3$-$C_{30}$ aromatic group are unsubstituted or substituted with a halogenatom, a $C_1$-$C_{30}$ alkyl group, a $C_1$-$C_{30}$ haloalkyl group, a $C_6$-$C_{30}$ aryl group, a $C_1$-$C_{20}$ alkoxy group, or the like, or a combination thereof; or a mixture thereof.

The alkyl group can have 1 to 16 carbon atoms. The shape of the alkyl group can be linear or branched, but is not limited thereto. The cycloalkyl group can have 3 to 30 carbon atoms. The aromatic group can have 3 to 30 carbon atoms. The number of carbon atoms in the alkyl, cycloalkyl and aromatic groups is not limited.

Non-limiting exemplary embodiments of the fluorinated carbonate include the compound of Formula 3:

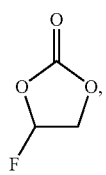

(3)

the compound of Formula 4:

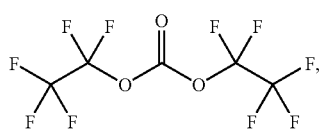

(4)

the compound of Formula 5:

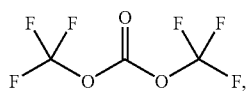

(5)

or a mixture thereof.

The fluorinated carbonate can have an endothermic peak in a temperature range where the resulting polyurethane foam is used. The temperature at which the endothermic peak of the fluorinated carbonate appears is not limited. In one exemplary embodiment, the fluorinated carbonate can have an endothermic peak at a temperature from about 0° C. to about 50° C., specifically from about 18° C. to about 30° C., more specifically about 25° C. The fluorinated carbonate has an endothermic peak at a lower temperature than a non-fluorinated carbonate, thus can be suitable for the preparation of a polyurethane foam with low thermal conductivity in the low-temperature range.

Generally, the larger the full width at half maximum ("FWHM") of the endothermic peak, the better the thermal insulation performance. There is no restriction on the FWHM of the endothermic peak. In one exemplary embodiment, the FWHM of the endothermic peak can be from about 2° C. to about 8° C., specifically from about 4.5° C. to about 6.5° C., more specifically about 5° C. A large FWHM indicates that the fluorinated carbonate has a broad melting point range. Accordingly, the fluorinated carbonate can absorb heat through a phase change over a broader temperature range to impede heat transfer, thus achieving good thermal insulation performance in the broad temperature range.

The larger the integrated area of the endothermic peak of the fluorinated carbonate, the better the thermal insulation performance. There is no restriction on the integrated area of the endothermic peak. In one exemplary embodiment, the integrated area of the endothermic peak of the fluorinated carbonate can be from about 5 watts degrees Celsius per gram ("W·° C./g") to about 50 W·° C./g, specifically from about 16 W·° C./g to about 30 W·° C./g, more specifically about 25 W·° C./g. A large integrated area of the endothermic peak indicates that the fluorinated carbonate can utilize a large amount of heat for phase transition. Accordingly, the fluorinated carbonate can store a large amount of heat supplied from the outside during phase transition and thus can exhibit good thermal insulation performance. In an embodiment, the enthalpy of melting of the fluorinated carbonate can be from about 50 Joules per gram ("J/g") to about 250 J/g, specifically from about 100 J/g to about 200 J/g, more specifically about 150 J/g.

In general, the temperature range, FWHM and area of the endothermic peak can be measured using a differential scanning calorimeter ("DSC"). In an embodiment, differential scanning calorimetry is performed several times with a DSC 2010 unit from TA Instruments at a scan rate of 5 degrees Celsius per minute ("° C./min"), for example, under an $N_2$ atmosphere, and the obtained values are normalized to determine the peak parameters.

There is no restriction on the content of the fluorinated carbonate in the polyurethane foam composition. In one exemplary embodiment, the fluorinated carbonate can be present in an amount from about 0.1 to 10 parts by weight, specifically from about 1 to about 9 parts by weight, more specifically from about 2 to about 8 parts by weight based on 100 parts by weight of the polyol. Within this range, the density of a resulting polyurethane foam derived from the composition can be controlled to a desired value because there is no sharp change in density. An increase in the density of the polyurethane foam leads to an increase in both mechanical strength and thermal conductivity. The use of the fluorinated carbonate in the amount specified above can optimize the density of the polyurethane foam while meeting both the requirements of mechanical strength and thermal conductivity.

The polyol can be an aliphatic compound having two or more hydroxyl groups (—OH) in the molecule. Exemplary polyols include, for example, a polyalkylene glycol, such as polypropylene glycol or polytetramethylene ether glycol; an amine terminated polyether polyol; or a polyester polyol; or the like, or a combination comprising at least one of the foregoing polyols. In an embodiment, the polyester polyol can be derived from adipic acid, phthalic anhydride or terephthalic acid.

The weight average molecular weight of the polyol can be in the range from about 100 Daltons to about 2000 Daltons, specifically from about 400 Daltons to about 1,500 Daltons, more specifically from about 600 Daltons to about 1300 Daltons, but is not limited to this range.

Exemplary polyisocyanates include, for example, polymeric diphenylmethane diisocyanate, toluene diisocyanate, or the like, or a combination comprising at least one of the foregoing polyisocyanates. The amount of the polyisocyanate used can be in the range of about 10 parts by weight to about 300 parts by weight, specifically in the range of about 100 parts by weight to about 150 parts by weight, more specifically about 125 parts by weight with respect to 100 parts by weight of the polyol, but is not limited to this range. When the content of the polyisocyanate falls within the range defined above, the polyisocyanate can appropriately react with the polyol to prepare a desirable polyurethane foam.

The kind of the catalyst is not limited so long as the catalyst assists in promoting the reaction between the polyol and the polyisocyanate. Exemplary embodiments of the catalyst include amine catalysts, including tertiary amine catalysts. Exemplary amine-based catalysts include dimethylcyclohexylamine, N,N,N',N",N"-pentamethyldiethylenetriamine, triethyldiamine, or the like, or a combination comprising at least one of the foregoing catalysts. The content of the catalyst can be in the range of about 0.1 to about 10 parts by weight, specifically from about 1 to about 5 parts by weight, more specifically from about 3 parts by weight with respect to 100 parts by weight of the polyol, but is not limited to this range. When the content of the catalyst falls within the range defined above, the foaming reaction time can be easily controlled.

The blowing agent can be a physical blowing agent. The physical blowing agent can be one that has a lower boiling point (e.g., about 120° C.) than the fluorinated carbonate. The physical blowing agent can be vaporized to produce a foam containing the fluorinated carbonate in a liquid or solid state.

In one exemplary embodiment, the physical blowing agent can be a $C_4$-$C_8$ hydrocarbon such as isobutene or isopentane. Exemplary embodiments of the physical blowing agent include $C_4$-$C_8$ cycloalkanes. Of these cycloalkanes, cyclopentane is suitable to produce a highly porous foam because of its high foaming action. In addition, cyclopentane has the lowest gaseous thermal conductivity among the known hydrocarbons and does not substantially affect the depletion of the earth's stratospheric ozone layer and global warming.

The content of the physical blowing agent can be in the range of about 1 to about 100 parts by weight, specifically from about 10 to about 20 parts by weight, more specifically from about 15 parts by weight with respect to 100 parts by weight of the polyol, but is not limited to this range. The physical blowing agent serves to control the thermal conductivity of the resulting polyurethane foam to a low value and can ensure sufficient strength of the foam at an optimum density.

In one exemplary embodiment, the physical blowing agent can be used in combination with a chemical blowing agent. Water can be used as the chemical blowing agent. The amount of the chemical blowing agent can be in the range of about 0.1 to about 10 parts by weight, specifically from about 0.5 to about 5 parts by weight, more specifically from about 1 to about 3 parts by weight with respect to 100 parts by weight of the polyol, but is not limited to this range. The use of the chemical blowing agent within the range specified above appropriately controls the reaction rate and results in closed cells of small size.

The foam stabilizer serves to control the structure of the cells while maintaining homogeneous distribution of the other components so that the cells are structurally stable without being destroyed even when the cells swell rapidly. The foam stabilizer can be a silicone resin. Exemplary silicone resins include polydimethylsiloxane resins, polysiloxane ether resins, or the like, or mixtures thereof. The amount of the foam stabilizer used can be in the range of about 0.1 to about 10 parts by weight, specifically in the range of about 1 to about 5 parts by weight, more specifically in the range of about 3 parts by weight with respect to 100 parts by weight of the polyol, but is not limited to this range. The use of the foam stabilizer within the range defined above facilitates the formation of a number of cells and can effectively stabilize the cells while protecting the cells from destruction.

In one exemplary embodiment, the composition can optionally further include a nucleating agent. The fluorinated carbonate also serves to form cell nuclei and inhibits the growth of closed cells. That is, since the fluorinated carbonate can play a role similar to the nucleating agent, the nucleating agent can be used in a smaller amount than otherwise used for the production of a foam.

The nucleating agent can be a perfluoroalkane compound, for example, perfluoropropane, perfluorobutane, perfluoroisobutane, perfluoropentane, perfluoroisopentane, perfluoroneopentane, perfluorocyclopropane, perfluorocyclobutane, perfluorocyclopentane, perfluorocyclohexane, perfluorocyclooctane, perfluorohexane, perfluoro-2-methylpentane, perfluoroheptane, perfluorooctane or perfluoro-2-ethylhexane, and the like, and a combination comprising at least one of the foregoing. The amount of the nucleating agent used can be in the range of about 0.1 to about 10 parts by weight, specifically in the range of about 1 to about 8 parts by weight, more specifically in the range of about 3 parts by weight with respect to 100 parts by weight of the polyol, but is not limited to this range.

In accordance with another exemplary embodiment, there is provided a foam derived from the polyurethane foam composition. The foam can be prepared by various methods. In an embodiment, the foam can be prepared by mixing the polyol, the catalyst, the foam stabilizer and water, adding the fluorinated carbonate, the nucleating agent, the blowing agent, and other optional additives, and adding the polyisocyanate to foam the mixture. During the foaming, a urethane solid matrix is formed to allow the resulting foam to contain isolated closed cells therein.

At this time, the fluorinated carbonate, the nucleating agent, the blowing agent and any other optional additives can be added stepwise while increasing the stirring rate from about 400 revolutions per minute ("rpm") to about 5,000 rpm, specifically from about 800 rpm to about 3,000 rpm, more specifically from about 1,600 rpm to about 2,000 rpm. The foaming can be conducted by stirring at a rate of about 5,000 rpm, specifically about 2,500 rpm, more specifically about 1,200 rpm from about 1 second to about 100 seconds, specifically from about 2 seconds to about 50 seconds, more specifically from about 3 seconds to about 5 seconds after the addition of the polyisocyanate.

The foam contains the fluorinated carbonate in a liquid or solid state even after the foaming. The fluorinated carbonate remains unvaporized even after the reaction because of its higher boiling point than the foaming temperature. Accordingly, the foam can be used as a thermal insulation material. The foam exhibits excellent thermal insulation performance at an ambient temperature not higher than about 150° C., specifically about 100° C., more specifically about 80° C. due to the presence of the fluorinated carbonate in a liquid or solid state. Therefore, the foam can be used as a thermal insulation material for a low-temperature system such as a refrigerator.

A detailed description of exemplary embodiments is further described with reference to the following examples. However, these examples are given merely for the purpose of illustration and are not to be construed as limiting the scope of the embodiments.

EXAMPLES

Example 1

100 parts by weight of polypropylene glycol, 2.3 parts by weight of a tertiary amine, 2.5 parts by weight of a silicone resin and 1.75 parts by weight of water are mixed together, and then 4 parts by weight of fluoroethylene carbonate ("FEC") of Formula 3 and 16.5 parts by weight of cyclopentane are added thereto.

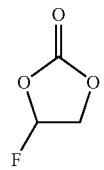

(3)

The mixture is stirred at a stepwise increasing rate to 5,000 rpm for about 20 seconds. 112 Parts by weight of a polyisocyanate is added to the mixture, followed by stirring at 5,000 rpm for about 3 seconds.

The resulting mixture is poured into a mold having inner dimensions of 200 centimeters ("cm") by 200 cm by 30 cm, foamed, cured for about 8 minutes, and demolded while maintaining the temperature of the mold at 40° C. to produce a polyurethane foam.

Example 2

The procedure of Example 1 is repeated, except that fluorodiethyl carbonate ("FDEC") of Formula 4 is used instead of the fluoroethylene carbonate ("FEC") of Formula 3.

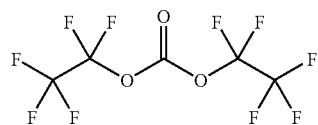

(4)

Example 3

The procedure of Example 1 is repeated, except that fluorodimethyl carbonate ("FDMC") of Formula 5 is used instead of the FEC of Formula 3.

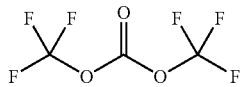

(5)

Examples 4-11

Polyurethane foams are prepared in the same manner as in Example 1, except that FEC is used in amounts of 1, 1.5, 2, 3, 3.1, 5, 10 and 23 parts by weight, respectively, based on 100 parts by weight of the polyol.

Comparative Example 1

The procedure of Example 1 is repeated, except that ethylene carbonate ("EC") of Formula 6 is used instead of the FEC of Formula 3.

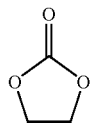

(6)

Comparative Example 2

The procedure of Example 1 is repeated, except that 3 parts by weight of diethyl carbonate ("DEC") of Formula 7 is used instead of the FEC of Formula 3.

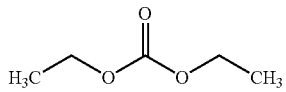

(7)

Comparative Example 3

The procedure of Example 1 is repeated, except that 3 parts by weight of dimethyl carbonate ("DMC") of Formula 8 is used instead of the FEC of Formula 3.

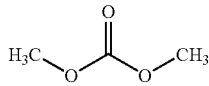

(8)

Comparative Example 4

The procedure of Example 1 is repeated, except that 3 parts by weight of propylene carbonate ("PC") of Formula 9 is used instead of the FEC of Formula 3.

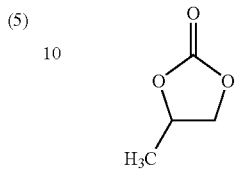

(9)

Comparative Example 5

The procedure of Example 1 is repeated, except that the FEC of Formula 3 is not used.

Experimental Example 1

Figure 2:
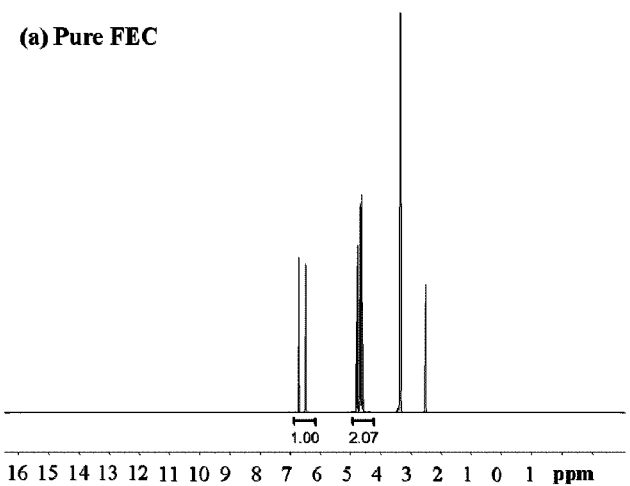
FIG. 2 is (a) a $^1$H NMR spectra of fluoroethylene carbonate and (b) a polyurethane foam prepared in Example 1.
Figure 2:
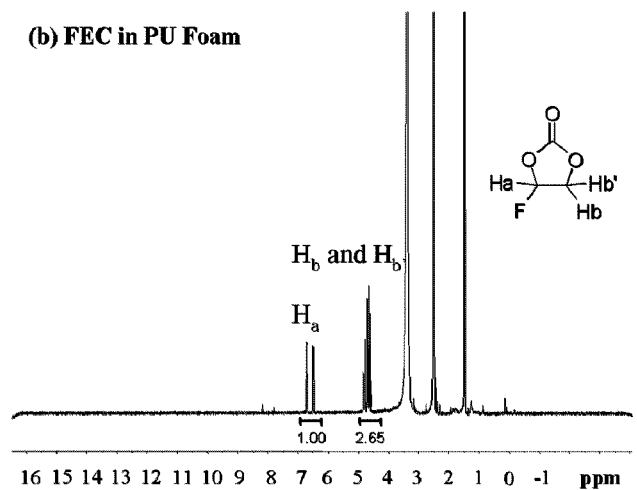

$^1$H NMR spectroscopy of the foam prepared in Example 1 and pure fluoroethylene carbonate is performed in dimethylsulfoxide ("DMSO"). The results are shown in FIG. 2. A comparison of the spectra reveals that the FEC is left within the foam even after foaming.

Experimental Example 2

Figure 3:
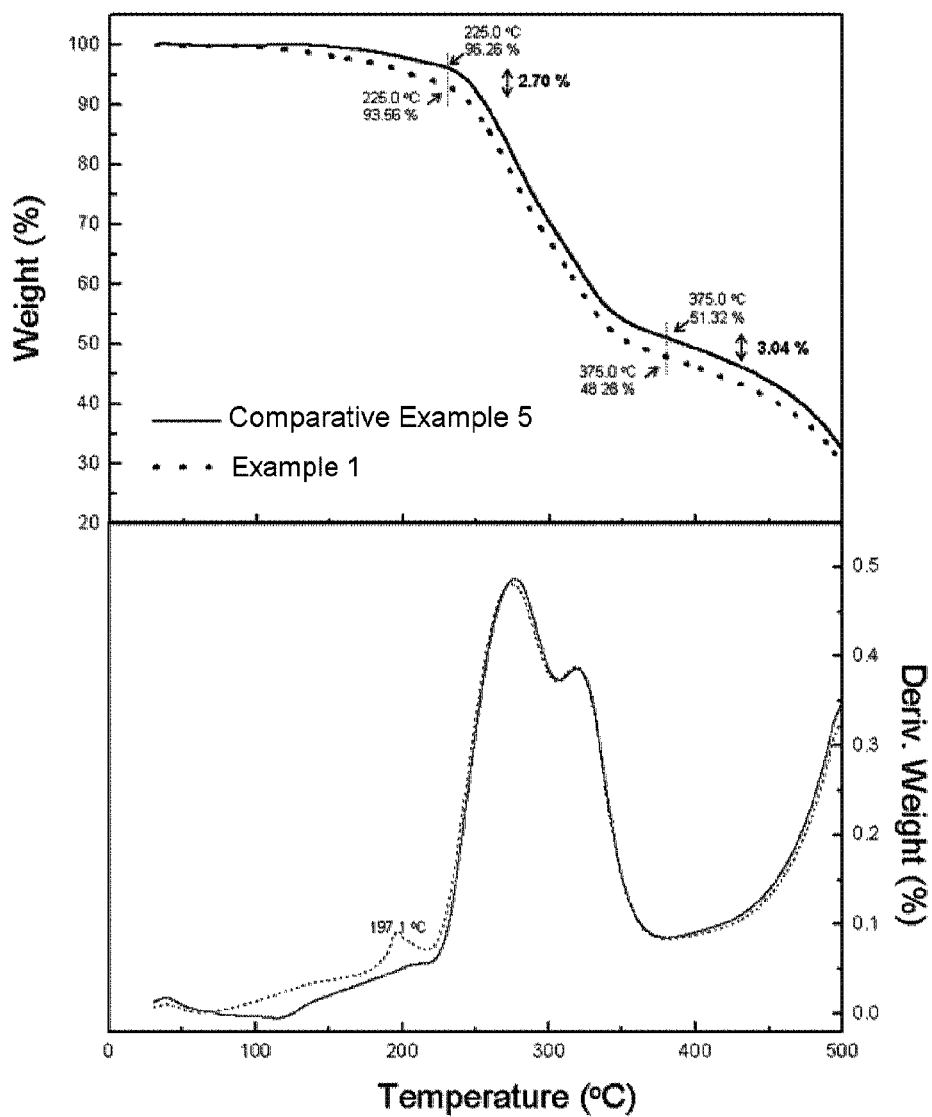
FIG. 3 is a graph illustrating weight percent versus temperature and shows the results of thermogravimetric analysis ("TGA") for foams prepared in Example 1 and Comparative Example 5.

Thermogravimetric analysis ("TGA", Q5000IR, TA Instruments) of the foams prepared in Example 1 and Comparative Example 5 is performed while heating at a rate from 5° C./minute ("° C./min") to 500° C. in air. The analytical results are shown in FIG. 3. From the curves, it can be observed that FEC is present in the foam of Example 1.

Experimental Example 3

Figure 4:
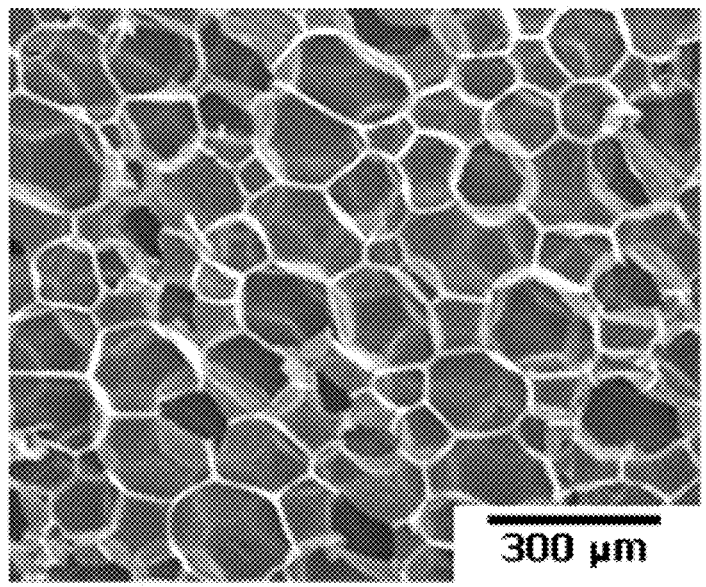
FIG. 4 is a scanning electron microscopy ("SEM") image of a polyurethane foam prepared in Example 1.
Figure 5:
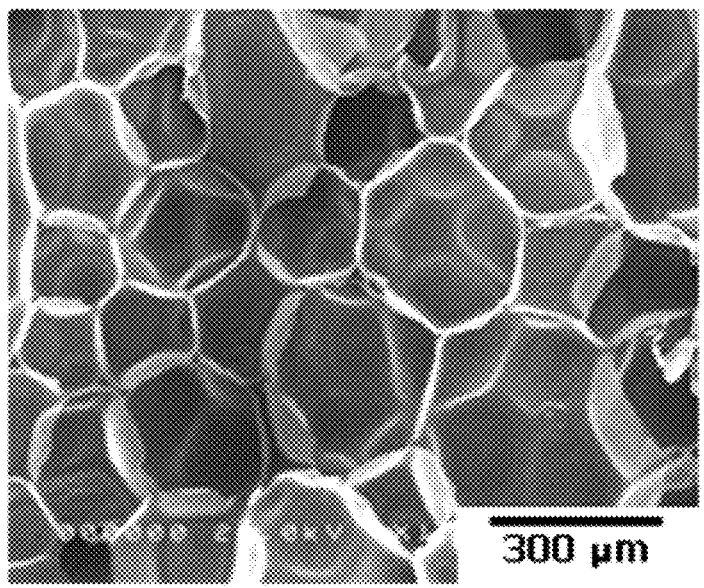
FIG. 5 is a SEM image of a polyurethane foam prepared in Comparative Example 5.

The microstructures of the polyurethane foams prepared in Example 1 and Comparative Example 5 are observed using a scanning electron microscope ("SEM"), and the images are shown in FIGS. 4 and 5, respectively. The images show that smaller independent cells, less than or equal to 200 micrometers ("μm",) are more uniformly formed in the polyurethane foam of Example 1 than in the polyurethane foam of Comparative Example 5.

Experimental Example 4

Figure 6:
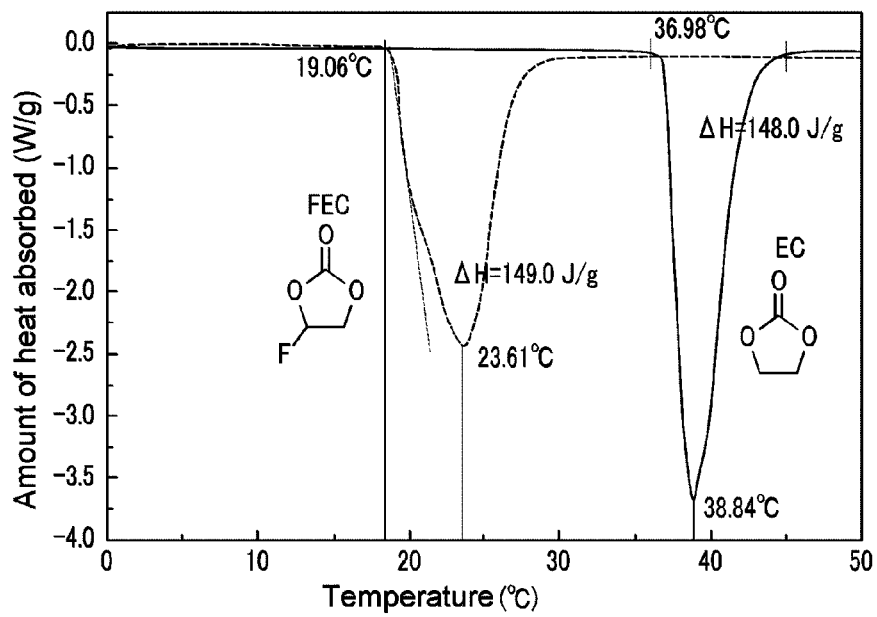
FIG. 6 is a graph illustrating heat absorbed versus temperature and showing the results of differential scanning calorimetry ("DSC") of carbonates in Experimental Example 4.

The amount of heat absorbed by the carbonates used in Example 1 and Comparative Example 1 are determined by differential scanning calorimetry ("DSC") at a heating rate of 5° C./min under a nitrogen atmosphere. The endothermic peaks of the carbonates are observed on the DSC curves. The graph of FIG. 6 confirms that the FEC has a lower freezing point and a much broader melting temperature range and absorbs more heat energy for melting than EC. These results lead to the conclusion that the fluorinated carbonate absorbs heat through a phase transition around room temperature to inhibit heat transfer.

Experimental Example 5

Figure 7:
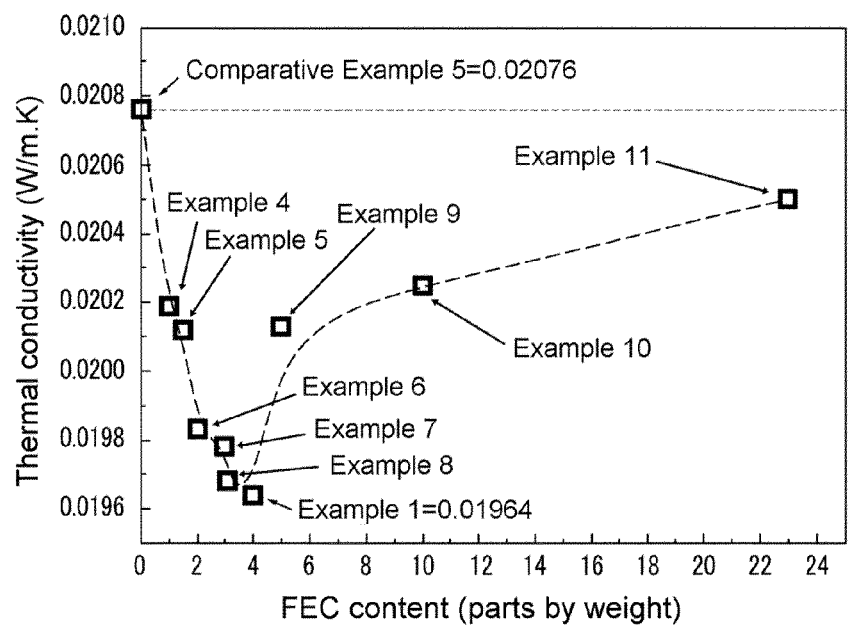
FIG. 7 is a graph showing the thermal conductivity of polyurethane foams with respect to fluoroethylene carbonate ("FEC") content prepared in Examples 1 and 4-11 and Comparative Example 5.

The thermal conductivities of the foams prepared in Examples 1-11 and Comparative Examples 1-5 are measured using a NETZSCH model HFM 436/3/1 Lambda in accordance with the ISO 8310 and ASTM C518 test methods. The results are shown in FIG. 7 and Table 1.

The bulk densities of the polyurethane foams prepared in Examples 1-3 and Comparative Examples 1-5 are measured, and the results are shown in Table 1.

TABLE 1

|  | Additives | Content (parts by weight) | Density (Kg/m³) | Thermal Conductivity (W/m · k) |
|---|---|---|---|---|
| Example 1 | FEC | 4 | 32.07 | 0.01964 |
| Example 2 | FDEC | 4 | 32.63 | 0.02035 |
| Example 3 | FDMC | 4 | 32.14 | 0.02035 |
| Comparative Example 1 | EC | 3 | 32.64 | 0.02079 |
| Comparative Example 2 | DEC | 3 | 32.58 | 0.02093 |
| Comparative Example 3 | DMC | 3 | 33.36 | 0.02133 |
| Comparative Example 4 | PC | 3 | 33.50 | 0.02089 |
| Comparative Example 5 | — | — | 33.76 | 0.02076 |

* Kg/m³ refers to kilograms per cubic meter; W/m · k refers to watts per meter Kelvin.

As is evident from the results in Table 1 and FIG. 7, the foams prepared using the fluorinated carbonates in Examples 1-11 have much lower thermal conductivities than the foams prepared using the non-fluorinated carbonates in Comparative Examples 1-4 and the foam prepared using no carbonate in Comparative Example 5.

As is apparent from the foregoing, exemplary embodiments of the foam are environmentally friendly and have excellent thermal insulation performance and therefore they can be used as thermal insulation materials for various applications.

Although exemplary embodiments have been described herein with reference to the foregoing embodiments, those skilled in the art will appreciate that various modifications and changes are possible without departing from the spirit of the invention as disclosed in the accompanying claims. Therefore, it is to be understood that such modifications and changes are encompassed within the scope of the invention.

What is claimed is:

1. A polyurethane foam composition, comprising:
a polyol;
a polyisocyanate;
a catalyst;
a foam stabilizer;
a blowing agent; and
a fluorinated carbonate, wherein the fluorinated carbonate is a compound represented by Formula 1:

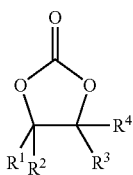

(1)

wherein $R^1$, $R^2$, $R^3$ and $R^4$ are the same or different and each of $R^1$, $R^2$, $R^3$ and $R^4$ independently represent a hydrogen atom, a fluorine atom, a $C_1$-$C_{16}$ fluoroalkyl group, a $C_3$-$C_{30}$ cycloalkyl group or a $C_3$-$C_{30}$ aromatic group, with the proviso that at least one of $R^1$, $R^2$, $R^3$ and $R^4$ is a fluorine atom or a $C_1$-$C_{16}$ fluoroalkyl group, and each of the $C_1$-$C_{16}$ fluoroalkyl group, the $C_3$-$C_{30}$ cycloalkyl group and the $C_3$-$C_{30}$ aromatic group are unsubstituted or substituted with a halogen atom, a $C_1$-$C_{30}$ alkyl group, a $C_1$-$C_{30}$ haloalkyl group, a $C_6$-$C_{30}$ aryl group, a $C_1$-$C_{20}$ alkoxy group or a combination thereof, a compound represented by Formula 2:

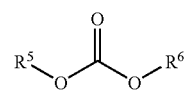

(2)

wherein $R^5$ and $R^6$ are the same or different and each of $R^5$ and $R^6$ independently represent a fluorine atom, a $C_1$-$C_{16}$ fluoroalkyl group, a $C_3$-$C_{30}$ cycloalkyl group or a $C_3$-$C_{30}$ aromatic group, with the proviso that at least one of $R^5$ and $R^6$ is a fluorine atom or a $C_1$-$C_{16}$ fluoroalkyl group, and each of the $C_1$-$C_{16}$ fluoroalkyl group, the $C_3$-$C_{30}$ cycloalkyl group and the $C_3$-$C_{30}$ aromatic group are unsubstituted or substituted with a halogenatom, a $C_1$-$C_{30}$ alkyl group, a $C_1$-$C_{30}$ haloalkyl group, a $C_6$-$C_{30}$ aryl group, a $C_1$-$C_{20}$ alkoxy group or a combination thereof, or a mixture thereof.

2. The composition of claim 1, wherein the fluorinated carbonate is selected from the group consisting of the compounds of Formulas 3, 4 and 5:

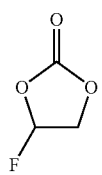

(3)

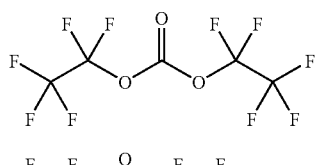

(4)

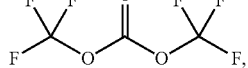

(5)

and a combination thereof.

3. The composition of claim 1, wherein the fluorinated carbonate has an endothermic peak at a temperature from about 18° C. to about 30° C.

4. The composition of claim 1, wherein the fluorinated carbonate has an endothermic peak whose full width at half maximum is from about 4.5° C. to about 6.5° C.

5. The composition of claim 1, wherein the fluorinated carbonate has an endothermic peak whose integrated area is from about 16 watts degrees Celsius per gram to about 30 watts degrees Celsius per gram.

6. The composition of claim 1, wherein the fluorinated carbonate has a freezing point from about −10° C. to about 40° C.

7. The composition of claim 1, wherein the fluorinated carbonate has a boiling point that is greater than a boiling point of the blowing agent.

8. The composition of claim 1, wherein the blowing agent is a hydrocarbon.

9. The composition of claim 1, wherein the fluorinated carbonate is present in an amount from about 0.1 to about 10 parts by weight, based on 100 parts by weight of the polyol.

10. A polyurethane foam derived from the composition of claim 1.

11. The polyurethane foam of claim 10, wherein the polyurethane foam contains the fluorinated carbonate.

12. The composition of claim 1, wherein $R^1$, $R^2$, $R^3$ and $R^4$ are the same or different and each of $R^1$, $R^2$, $R^3$ and $R^4$ independently represent a hydrogen atom, a fluorine atom or a $C_1$-$C_{16}$ fluoroalkyl group, with the proviso that at least one of $R^1$, $R^2$, $R^3$ and $R^4$ is a fluorine atom or a $C_1$-$C_{16}$ fluoroalkyl group, and the $C_1$-$C_{16}$ fluoroalkyl group is unsubstituted or substituted with a halogen atom, a $C_1$-$C_{30}$ alkyl group, a $C_1$-$C_{30}$ haloalkyl group, a $C_1$-$C_{20}$ alkoxy group or a combination thereof, and wherein $R^5$ and $R^6$ are the same or different and each of $R^5$ and $R^6$ independently represent a fluorine atom or a $C_1$-$C_{16}$ fluoroalkyl group, with the proviso that at least one of $R^5$ and $R^6$ is a fluorine atom or a $C_1$-$C_{16}$ fluoroalkyl group, and the $C_1$-$C_{16}$ fluoroalkyl group is unsubstituted or substituted with a halogen atom, a $C_1$-$C_{30}$ alkyl group, a $C_1$-$C_{30}$ haloalkyl group, a $C_6$-$C_{30}$ aryl group, a $C_1$-$C_{20}$ alkoxy group or a combination thereof.

* * * * *